(12) United States Patent
Karam

(10) Patent No.: US 7,586,840 B2
(45) Date of Patent: Sep. 8, 2009

(54) METHOD AND APPARATUS FOR DETECTING AND FIXING FAULTS IN AN INLINE-POWER CAPABLE ETHERNET SYSTEM

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 854 days.

(21) Appl. No.: 11/139,007

(22) Filed: May 25, 2005

(65) Prior Publication Data

US 2006/0268898 A1    Nov. 30, 2006

(51) Int. Cl.
*H04L 12/26* (2006.01)
*G01R 31/08* (2006.01)
(52) U.S. Cl. .................. 370/216; 370/910; 379/399.01
(58) Field of Classification Search .............. 370/216, 370/217, 400, 910, 401, 908; 713/300, 324; 379/399.01
See application file for complete search history.

(56) References Cited

U.S. PATENT DOCUMENTS

| | | | |
|---|---|---|---|
| 6,646,546 B1 * | 11/2003 | Butler et al. ............... 370/276 |
| 6,650,622 B1 | 11/2003 | Austerman, III et al. | |
| 7,049,825 B2 * | 5/2006 | Carruthers ................ 324/509 |
| 2002/0140433 A1 * | 10/2002 | Lawson et al. ............ 324/509 |
| 2004/0073597 A1 | 4/2004 | Caveney et al. | |
| 2004/0227522 A1 | 11/2004 | Male | |
| 2004/0257743 A1 * | 12/2004 | Chen et al. ................ 361/119 |

OTHER PUBLICATIONS

PCT/US2006/020278 IPER dated Dec. 13, 2007 of corresponding U.S. Appl. No. 11/139,007 filed May 25, 2005; pp. 1-8.
Maxim Integrated Products, '+65V Simple Swapper Hot-Swap Switches,' 2001, 19-1706. Rev. 0; Jul. 2001, pp. 1-11.

\* cited by examiner

*Primary Examiner*—Wing F Chan
*Assistant Examiner*—Saba Tsegaye

(57) ABSTRACT

The present disclosure provides for the sensing and detection of potential ground faults, and location of faulty ports. Circuitry is provided that utilizes the isolation resistor provided in the PSE. The present disclosure provides for temporarily breaking isolation to help improve the detection process disclosed herein.

5 Claims, 9 Drawing Sheets

US 7,586,840 B2

1

METHOD AND APPARATUS FOR DETECTING AND FIXING FAULTS IN AN INLINE-POWER CAPABLE ETHERNET SYSTEM

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission of Ethernet packets with the transmission of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RJ-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the variants described above.

Turning now to FIGS. 1D and 1E, electrical schematic diagrams illustrate variants of the IEEE 802.3af standard in which 1000 BaseT communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1,2, Pair 3,4 or Pair 4,5, Pair 7,8. In the circuit shown in FIG. 1E a PD associated with Pair 1-2 is powered by Inline Power over Pair 1-2 and a PD associated with Pair 3-4 is similarly powered. The approach used will depend upon the PD to be powered. Inline Power is also available through techniques that are non-IEEE 802.3 standard compliant as is well known to those of ordinary skill in the art.

In order to provide regular Inline Power to a PD from a PSE it is a general requirement that two processes first be accomplished. First, a "discovery" process must be accomplished to verify that the candidate PD is, in fact, adapted to receive Inline Power. Second, a "classification" process must be accomplished to determine an amount of Inline Power to allocate to the PD, the PSE having a finite amount of Inline Power resources available for allocation to coupled PDs.

The discovery process looks for an "identity network" at the PD. The identity network is one or more electrical components that respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some Inline Power (not "regular" Inline Power, i.e., reduced voltage and limited current) as the discovery signal to measure resistance across the two pairs of conductors to determine if the 25,000 ohm resistance is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular Inline Power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0-5 | 15.4 |
| 1 | 8-13 | 4.0 |
| 2 | 16-21 | 7.0 |
| 3 | 25-31 | 15.4 |
| 4 | 35-45 | Reserved |

The discovery process is therefore used in order to avoid providing Inline Power (at full voltage of −48VDC) to so-called "legacy" devices, which are not particularly adapted to receive or utilize Inline Power.

The classification process is therefore used in order to manage Inline Power resources so that available power resources can be efficiently allocated and utilized.

The IEEE 802.3af standard calls for the power supply in a PSE to be maintained in a floating ground state. This leads to the possibility that a fault or incorrect installation of a PD may cause a direct connection to ground. As the many ports of a switch may share a common power and/or ground connection, an improper grounding of one port may lead to a failure of all ports of a switch.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention described in the following detailed description are directed at power and data redundancy in a single wiring closet. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
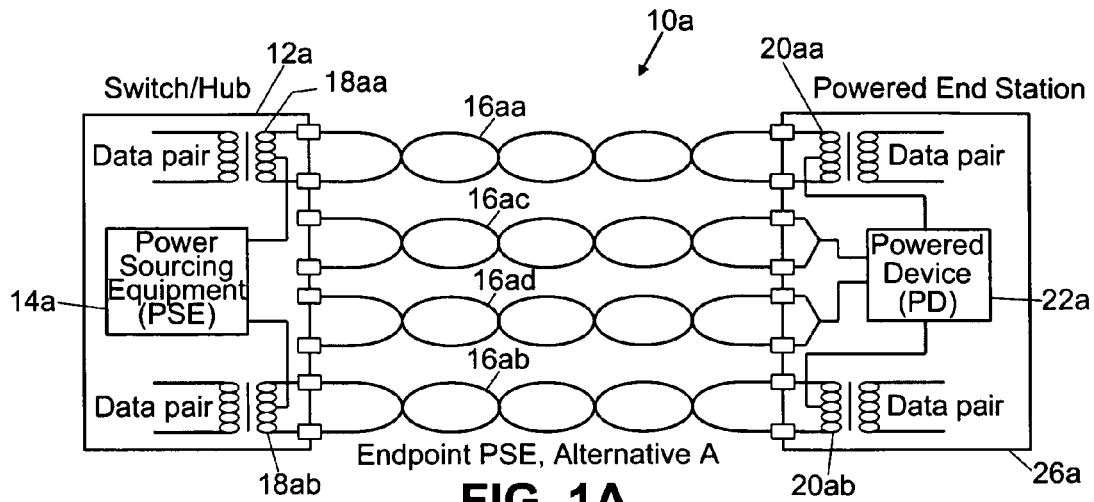
FIGS. 1A, 1B, 1C, 1D and 1E are electrical schematic diagrams of portions of data telecommunications networks in accordance with the prior art.
Figure 1B:
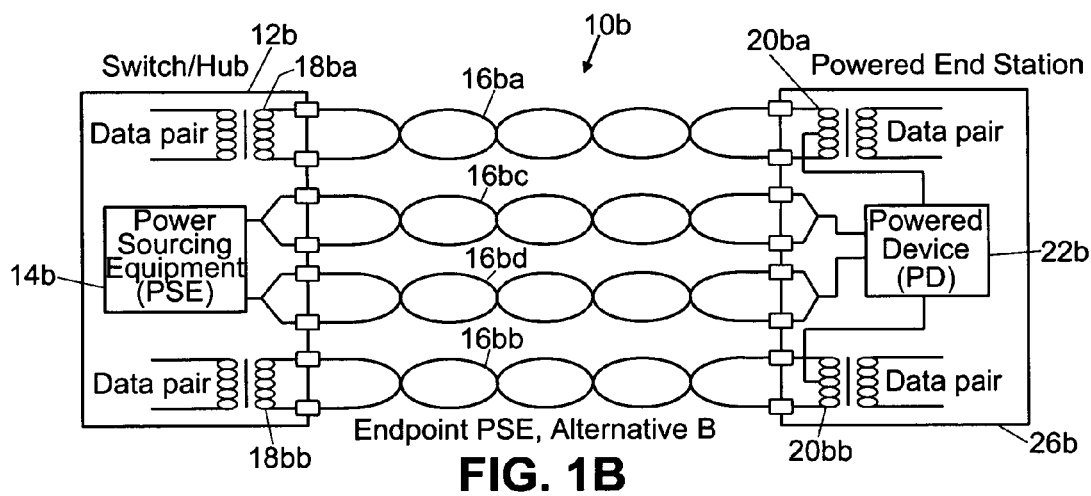
Figure 1C:
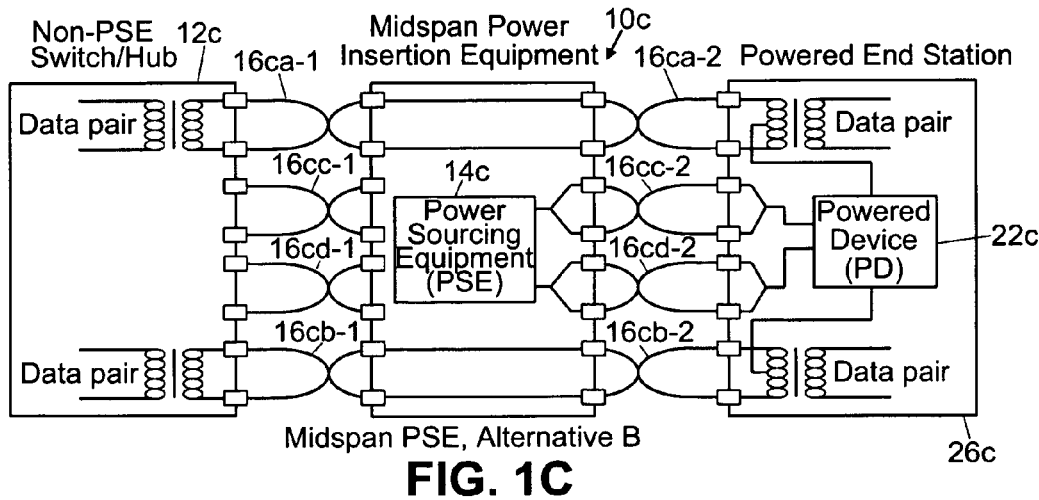
Figure 1D:
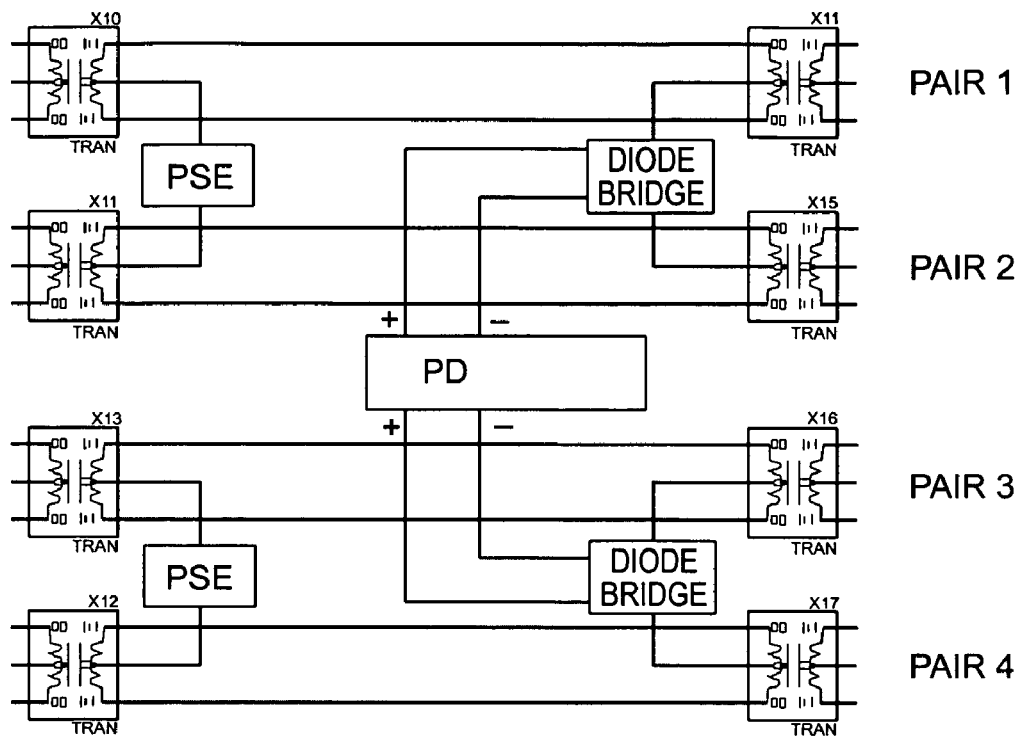
Figure 1E:
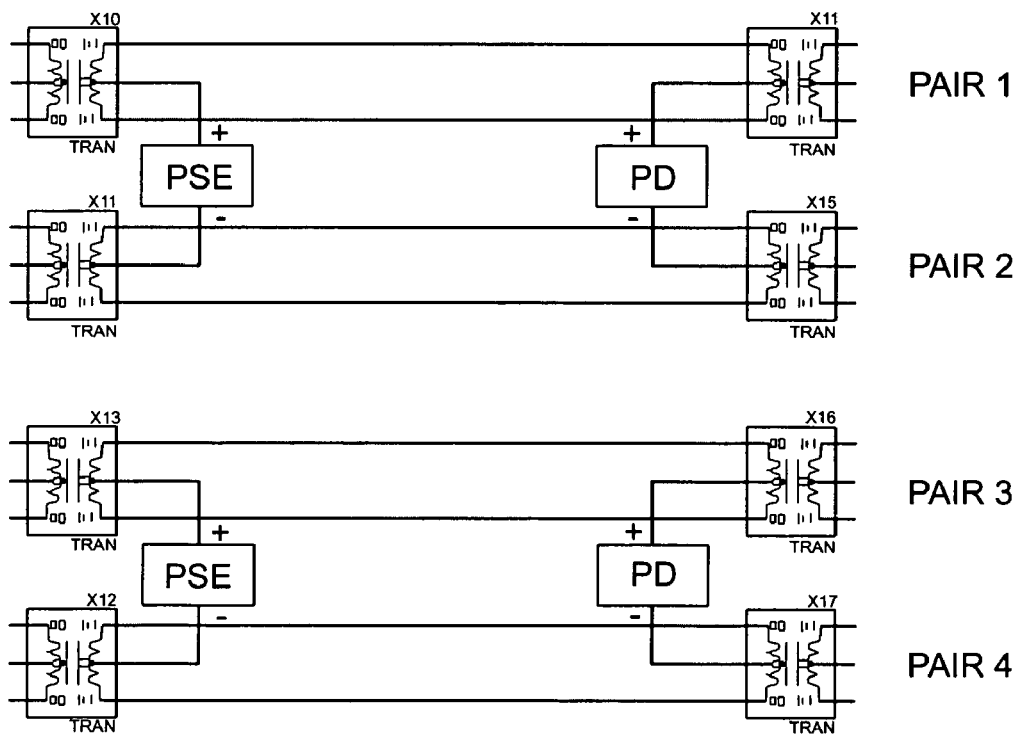
Figure 2:
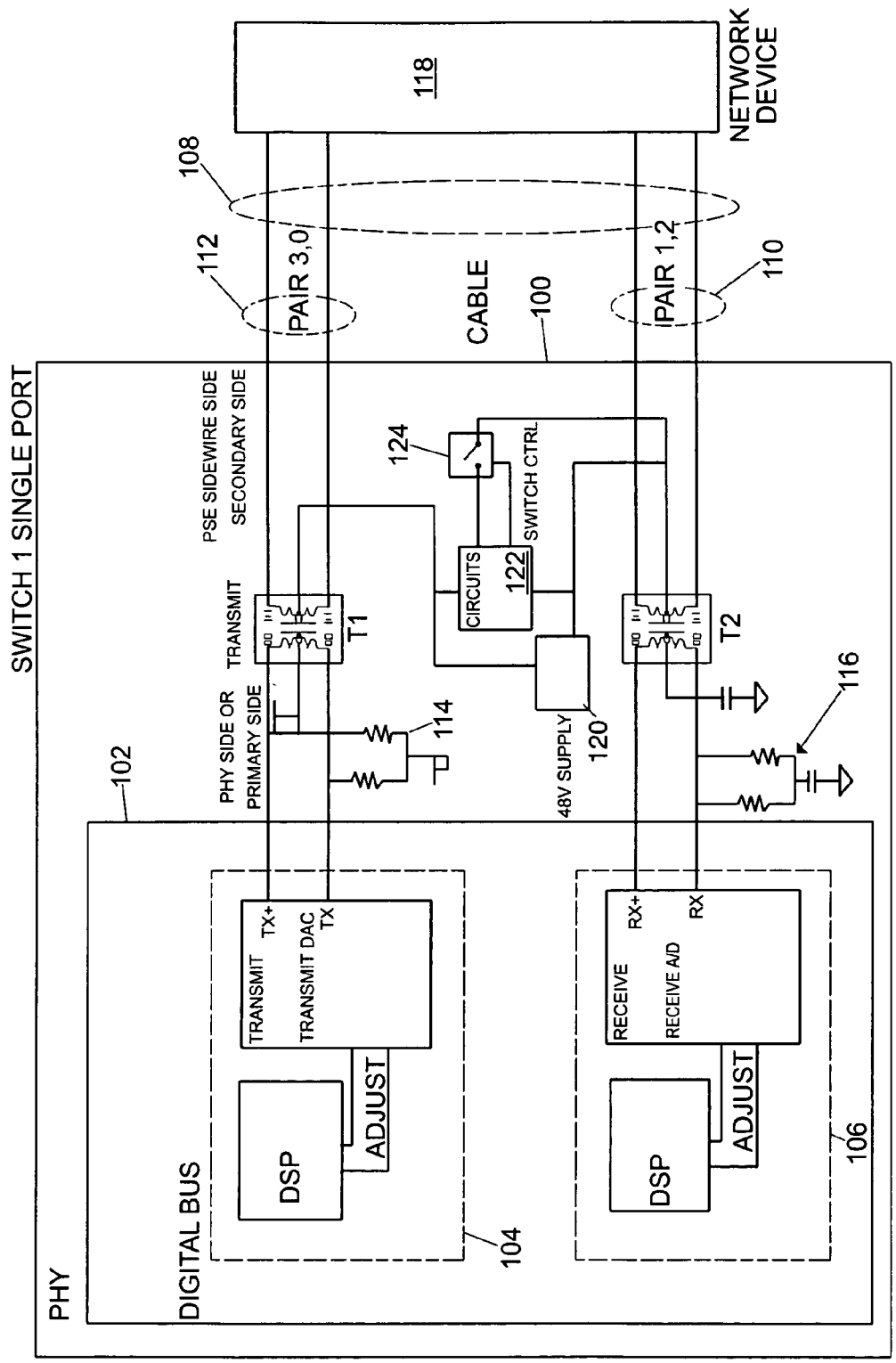
FIG. 2 is an electrical schematic diagram of a typical Ethernet 10/100 Base T connection in accordance with the prior art.

Turning now to FIG. 2 a typical 2-pair Ethernet (10 Base T, 100 Base T and 1000BT if 4-pairs were used) connection is illustrated. Box 100 encompasses the Ethernet port as it might exist in a network device such as a switch, hub, router or like device. Within port 100 is a PHY or physical layer device 102, which includes transmit circuitry 104 and receive circuitry 106. The transmit circuitry 104 interfaces to a connector such as an RJ-45 connector (not shown here) and through the connector to a cable 108 which includes at least two pairs of conductors, the Pair 1-2 (110) and the Pair 3-6 (112). The interface between the transmit circuitry 104 and the cable 108 includes a center-tapped magnetic device such as transformer T1. T1 has a PHY-side including pins 1 and 2 and center tap 6, and a wire side including pins 3 and 5 and center tap 4. The PHY side is also referred to as the primary side; the wire side is also referred to as the secondary side of the magnetic device T1. Termination circuitry 114 provides a Vdd bias (here illustrated as +3.3VDC) to the primary of T1. The secondary of T1 is coupled to cable pair 112 which is, in turn, coupled in operation to a network device 118 which may be another hub, switch or router or a PD such as a Voice Over Internet Protocol (VoIP) telephone or other network device.

The interface between the receive circuitry 106 and the cable 108 includes a center-tapped magnetic device such as transformer T2. T2 has a PHY-side including pins 1 and 2 and center tap 6, and a wire side including pins 3 and 5 and center tap 4. The PHY side is also referred to as the primary side; the wire side is also referred to as the secondary side of the magnetic device T2. Termination circuitry 116 provides a ground bias to the primary of T2. The secondary of T2 is coupled to cable pair 110 which is, in turn, coupled in operation to a network device 118. If the pairs of conductors shown belonged to a 1000 Base T wired data telecommunications network segment then each pair would transmit and receive at the same time and all four pairs in the cable would be used.

Center tap pins 4 of T1 and T2 are coupled to inline power circuitry including a 48 VDC power supply 120 for providing Inline Power over cable 108, control circuitry 122 and switch circuitry 124.

Figure 3:
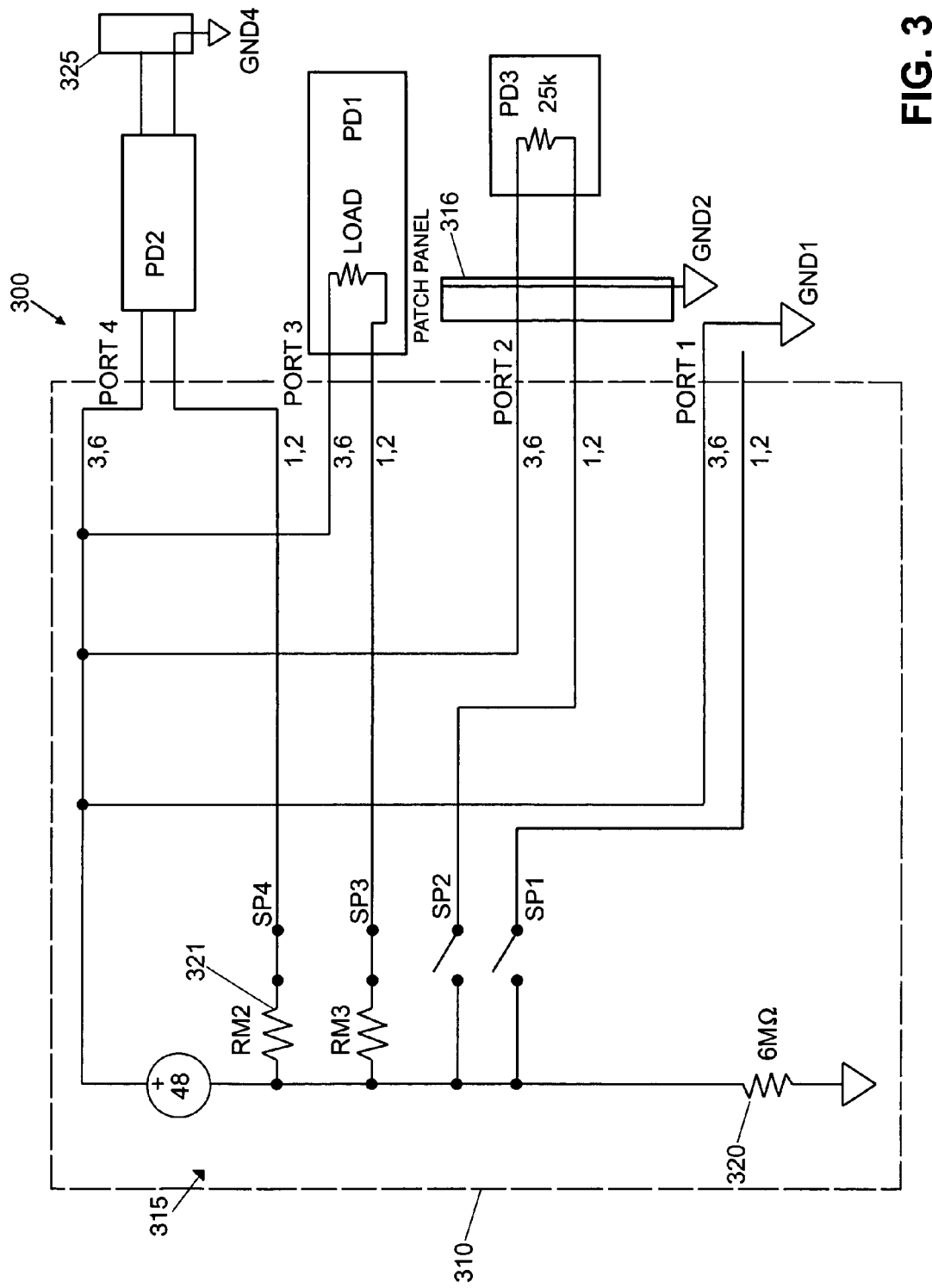
FIG. 3 is a block diagram of an Ethernet system illustrating the various ways in which a ground fault may be introduced into the system.

FIG. 3 is a block diagram of a simplified inline power delivery system residing inside an Ethernet system 300 illustrating various potential ground fault scenarios. FIG. 3 includes an example of an Ethernet switch 310 providing a floating 48V source of inline power to connected PDs. The switch 310 includes a 48V power source 315 that is required to be floating (i.e., not tied to chassis ground) made to appear as a grounded source by coupling the source 315 to ground through a 6 MΩ resistor 320 provided to supply a path for transient voltages and to act as a bleeder for static discharge. The requirements of isolation place a minimum limit on the value of resistor 320 to be greater than about 2 MΩ. FIG. 3 illustrates a scenario referred to in the IEEE 802.3af specification as "Environment A" in which no port-to-port isolation is required, and where all PD devices connected to such a system share a common node of the 48 v supply, in this case the positive rail of the 48 v source shown, 315, that ties pair 3,6 going to each PD together to control the cost of adding a power-switch on each 3,6 pair of every port similar to SP4 the one shown for pair 1,2 on port 4 (in FIG. 3) and available on pair 1,2 of each port to help turn the power on/off.

PD1 is shown being coupled to port 3 of the switch 310, and nominally expects to receive inline power from the switch 310. PD2 is shown as being coupled to switch 315 through port 4, and is shown as being externally powered by an external power source 325 that is locally connected, such as a conventional "brick" or some other source of power other than the 310 switch or may be powered by both an external source and switch 310 where switch 310 act as a 'hot-standby' and thus may or may not be supplying current simultaneously along with the external PD power source. The 310 switch may supply data or power or both to any device attached to its ports. PD 3 is shown as being coupled to the switch 310 through port 2, and is represented as not being powered yet, i.e., it is presenting a 25 k discovery signature and associated circuitry.

As can be seen from FIG. 3, all PDs connected to the switch 310 have conductor pair 3,6 coupled to the positive side of the power source 315, and the return pair 1,2 are coupled to the negative side of the source 315 via switches. FIG. 3 shows how a powered device such as PD1 can be negatively affected by ground faults occurring on other ports of the switch. For example, PD2, which has already been discovered and supplied with inline power, may have its' external power supply fail and cause a connection to ground to occur through the failed power supply. PD3 may be coupled to ground through a failure in the patch panel 316, potentially causing PD2 to fail the discovery process and never receive inline power. Another possible failure may occur in the switch itself, as shown by port 1 having an internal or external short to ground. Even though we show the fault to ground on pair 3,6 the same concept applies to pair 1,2 of any port.

In all these cases, the ground failure on one port may potentially cause a failure on one or more ports, for example, failures may cause potential discovery issues, or a current-sense measurement offset between any two ports that have lower impedance to ground, as the pairs are all coupled to a common node on the power source 315. Thus, even though the system is designed to be floating, a single failure can cause the system to be grounded and no longer appear as floating.

As will be appreciated by those of ordinary skill in the art, a short to ground at an external node (but not necessarily through a relatively high value resistor such as 320 as provided inside the system) may cause another fault to occur at a ground point located at a location other than the first fault location, thus enabling current flow between devices. This may result in causing ground loops, potential problems for discovery, and offsets in DC current measurements on the rails of the 48 v supply.

Another problem of such current flows may be errors introduced in the measurements performed on each port regarding DC current used to calculate power consumption. Errors may be introduced as stray current flowing between ground points may add or subtract to the actual current measured on the ports, thus introducing errors into such measurements leading to errors in the calculations of the available power left to power more devices since the supply voltage of 315 and the total delivered power (voltage * current) must not exceed the total available power that the source can supply as the main power source to all devices. Such calculations are normally done to keep track of the power budget at all times on a local system processor along with and or the inline power controllers. The DC current measurement is based on measuring a voltage drop across a sense resistor that typically has a value less than or equal to 1 Ohm (i.e., acting as an Ammeter) and that is placed in series with the inline power path on one or both rails of the 48 v supply on each port. Thus the need to detect such faults, isolate them to a single port and potentially disable such a port or force an attempt to isolate and repair the fault is a useful system feature as the number of ports connected to a single supply grows.

The present disclosure provides for the sensing and detection of potential ground faults, and location of faulty ports. Circuitry is provided that utilizes the isolation resistor provided in the PSE. The present disclosure provides two means for detection of a ground fault including temporarily breaking isolation to help improve the detection process or using a resistor and associated circuitry are disclosed herein.

The disclosed processes may be operable under software control to achieve periodic detection, or at predefined events such as port discovery and power up. If the process results in the detection of a fault, the disclosed process may then initiate a port search algorithm to track down and flag the failed port. Such circuitry may be coupled to one or both rails of the power source, and allow for tracking down a failed port among the many ports of a switch. Circuitry may be provided that may flag a potential short prior to power being applied. In a further embodiment, an indication may be provided to an affected PD to flag a faulty connection. A visual indication may be provided on the PD, such as an indication that there is a faulty condition on the PDs associated port. Inline switches (which may comprise power FET or mechanical switches in nature) may be provided to shut down affected ports if desired.

Figure 4:
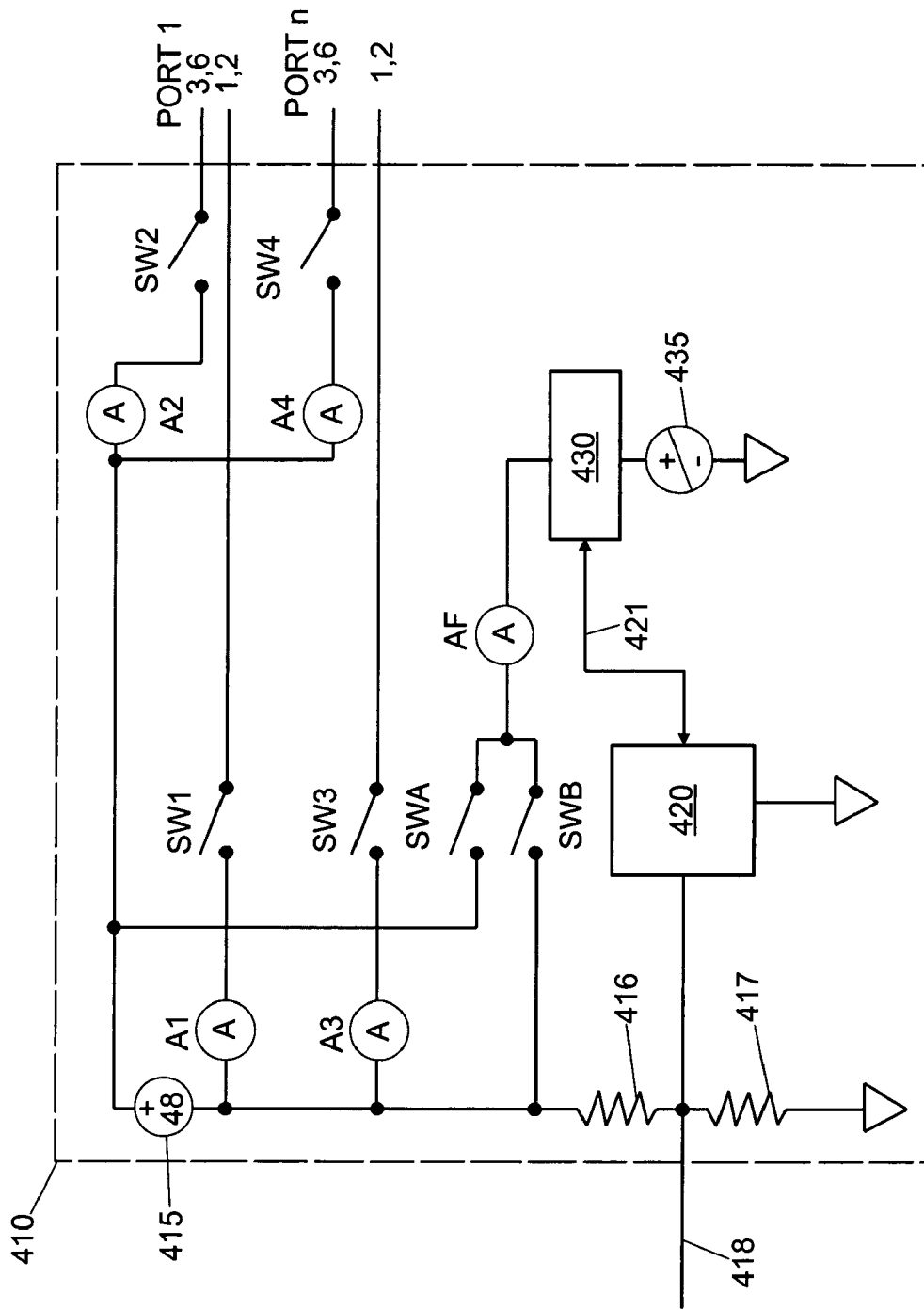
FIG. 4 is a block diagram of an Ethernet system configured to detect ground faults in accordance with this disclosure.

FIG. 4 is conceptual block diagram of an inline power module in an Ethernet system 400 configured to detect ground faults in accordance with the teachings of this disclosure. FIG. 4 includes an Ethernet switch 410 configured to provide inline power to ports 1 . . . n. Power is shown being delivered down two pairs, i.e., pairs 3,6 and 1,2; however it is contemplated that the teachings of this disclosure may be applied to system configured to deliver power down unused pairs as well. The positive rails of ports 1 . . . n are coupled to the positive side of power supply 415, while the negative rails of ports 1 . . . n are coupled to the negative side of power supply 415. The negative rails also include power switches SW1 and SW3 for controlling power down ports 1 . . . n as is known in the art.

The power supply is placed in a grounded condition through the use of 6MΩ of resistance in accordance with the IEEE standard 802.3af. However, FIG. 4 shows that in one preferred embodiment, the floating resistor my be split into multiple parts to allow for sensing currents or to create a voltage divider as is known in the art. By providing a multiple-part resistance, a voltage divider is created having a voltage divider sensing node at node 418. FIG. 4 shows the use of two 3MΩ resistors 416 and 417 coupled electrically in series to facilitate the sensing of current at node 318. It will be understood that other resistance schemes and/or values may be employed depending on the types of signals desired to be sensed.

FIG. 4 includes ground fault detection circuitry 420 for detecting ground faults by sensing the voltage and current at node 418. Hence, in one embodiment, the 6MΩ resistance already provided for in the IEEE specification (i.e., above the minimum of 2MΩ is required to meet the isolation requirement to ground) is used in conjunction with sensing circuitry 420 to detect a fault to ground by detecting whether voltage or current levels at node 418 exceed a predefined level. In one preferred embodiment, node 418 is sensed to determine whether the voltage exceeds 1.8V using circuitry conventional in the art, such as a buffer and an A/D in combination with digital control and logic circuitry along with breakdown protection.

Leakage conditions may affect the measurements sensed at node 418. Accordingly, the present disclosure provides for additional sensing to more accurately detect a fault, and to locate the port on which the fault has occurred.

As will be appreciated, if a port is coupled to ground through a resistance of 1-2 kΩ, detecting such low levels of current through the 6MΩ may be difficult. The present disclosure provides for a temporary 'breaking' of isolation to ground by enabling a source that can be either positive or negative relative to ground and capable of supplying currents in the tens of milli-amp range on a selected rail of the 48 v source thereby assisting a particular port in the detection of a short.

The available current from the power source referenced to ground allowed to flow freely into a faulty port should be increased in accordance with this disclosure to enable the current detection circuitry to easily detect the fault, since the DC accuracy of such circuitry is limited due to dynamic range limitations. Current detection circuitry may comprise of a sense resistor inline with the power rails of the 48 v supply FIG. 4 shows port-locate circuitry 430 and voltage source 435 electrically coupled in series with switches SW A and SW B. Source 435 preferably can be positive or negative relative to local chassis ground in potential. In a preferred embodiment, the find port circuitry 430 is in communication with switches SW A and B so as to selectively sink (or source) the power provided by source 435 down a selected rail of the 48 v source and into one pair of any port. This process provides for a temporary cancellation or disruption of the isolation from ground by providing a path to ground or another source of power that can sink or source current referenced to ground. This allows for detection circuitry measuring currents in and out of each port to measure the fault current and identify the faulty port.

The disclosed process thus provides increased current referenced to ground that can flow through the DC current sense circuitry available on each port on both rails of the 48 v, thus lowering measurement requirements for the detection circuitry and increasing the feasibility of tracking the faulty port. It is contemplated that the find-port circuitry may be fused, actively current limited, and include a relay rated at 2 kV to comply with safety and isolation standards.

FIG. 4 also includes switch and current sense circuitry SW2, SW1, SW3 and SW4 coupled to both rails of the floating supply 415 to further track down a faulty port. It is contemplated that this switching circuitry may include conventional circuitry for sensing the current draw on each rail of the 48 v supply on each port. It is contemplated that the switching and current sense circuitry may be embodied in the PSE's inline power controller circuitry. All the switches shown may comprise power-FET transistors, mechanical relays or a mixture of both.

Under normal conditions, the current out of SW2 (measured with Ammeter A2 of port 1) should be equal in value to the returning current going into SW1 of port 1 (measured with Ammeter A1) this is a basic 'GFI' (ground fault interrupt) function that can be active at all times on all available ports and is used in parallel with other circuitry to help in the detection and location of ground and other any other faults. To ease the requirements of the measurement circuitry required, either SWA or SWB may be activated and source 435 may be switched between either a positive negative supply potential when referenced to chassis ground. The source 435 is limited in its sourcing capability so as to ease the DC current measurement by increasing the magnitude of the current that can be supplied, thus making fault detection easier since the Ammeters shown have a limited dynamic range.

As will now be appreciated, providing increased sensing current enables easier detection of imbalances on rails of a particular port. For example, a fault on port 1 to ground may draw enough current out of source 435 to enable the ammeter circuitry associated with SW1 or SW2 to easily measure the change in current flow and match the magnitude to that measured with ammeter AF, such current will disappear once SWA or SWB are opened or isolation is restored.

It would be very hard for such circuitry to measure the 1 or 2 μA to local chassis ground through the high value resistor that is provided per safety and isolation directives. Therefore, the disclosed process provides a larger current that is selectively injected into the system to help track down a fault by allowing the ground reference current to seek the proper path available to the reach the fault point in a controlled manner and under the control of the hardware and software.

Once the faulty port is detected, the port may be flagged as faulty or it can be shut down. The port may be examined to verify the fault clearing. An administrator or a PD user may be notified to allow for debug under their control. Other alternating current means may be employed to achieve a ground fault detection may be used where source 435 uses a known total capacitance to ground originally designed in the system. In such an embodiment, its own series capacitance may be utilized to create a capacitive divider used to measure and process an AC sense signal. Using such an embodiment, the AC sense signal may be examined to potentially detect a faulty point of contact that lowers the impedance of the total capacitance to ground through the ammeters shown in FIG. 4 of this disclosure. Thus, embodiments of this disclosure may be designed to detect both AC as well as DC currents.

Circuitry provided for in the structure of sensing circuitry 420 may be operated independently, sequentially (it triggers an isolation cancellation), or in parallel with the isolation cancellation scheme in order to ease the fault discovery.

Figure 5:
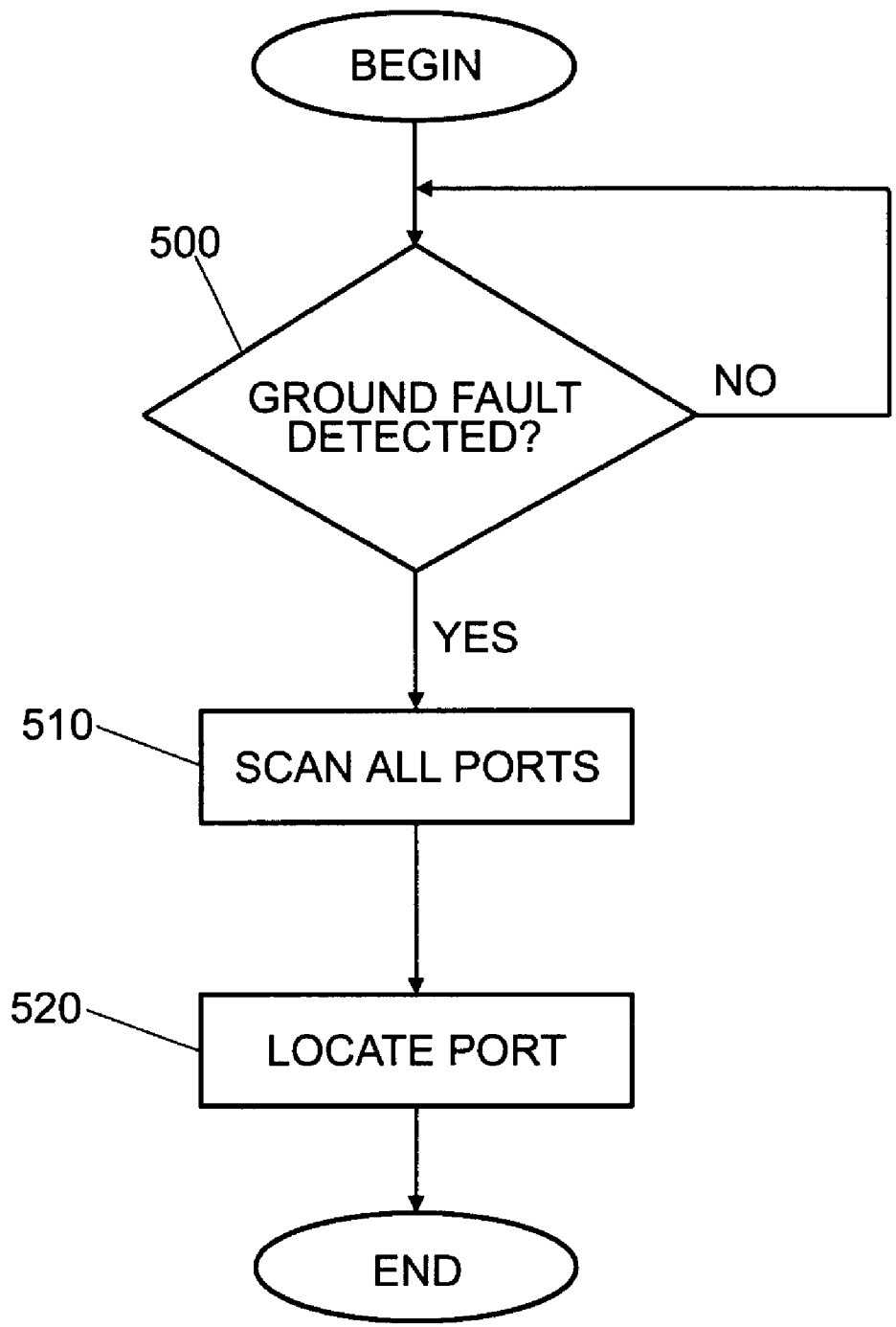
FIGS. 5 and 6 are flow diagrams of method for detecting ground faults in an Ethernet system in accordance with this disclosure.

FIG. 5 is a flowchart of one embodiment of a method for locating a ground fault in accordance with the teachings of this disclosure. The process begins in act 500, where the process determines if a ground fault has been detected. In one embodiment, the ground fault circuitry may be configured as disclosed above to sense whether a predetermined threshold sensed on the negative rail has been exceeded. In one embodiment, if a ground fault has been detected, a current mismatch signal 421 is provided by the ground fault detection circuitry 420 to the find port circuitry 430 that may communicate that a fault has been detected.

The process moves to act 510, where all ports are scanned to locate the port on which the fault has occurred responsive to a fault detection. In act 520, the port at fault is located. In one embodiment, the port-locate circuitry and software may be employed as described above to scan and locate the port on which the fault has occurred.

Figure 6:
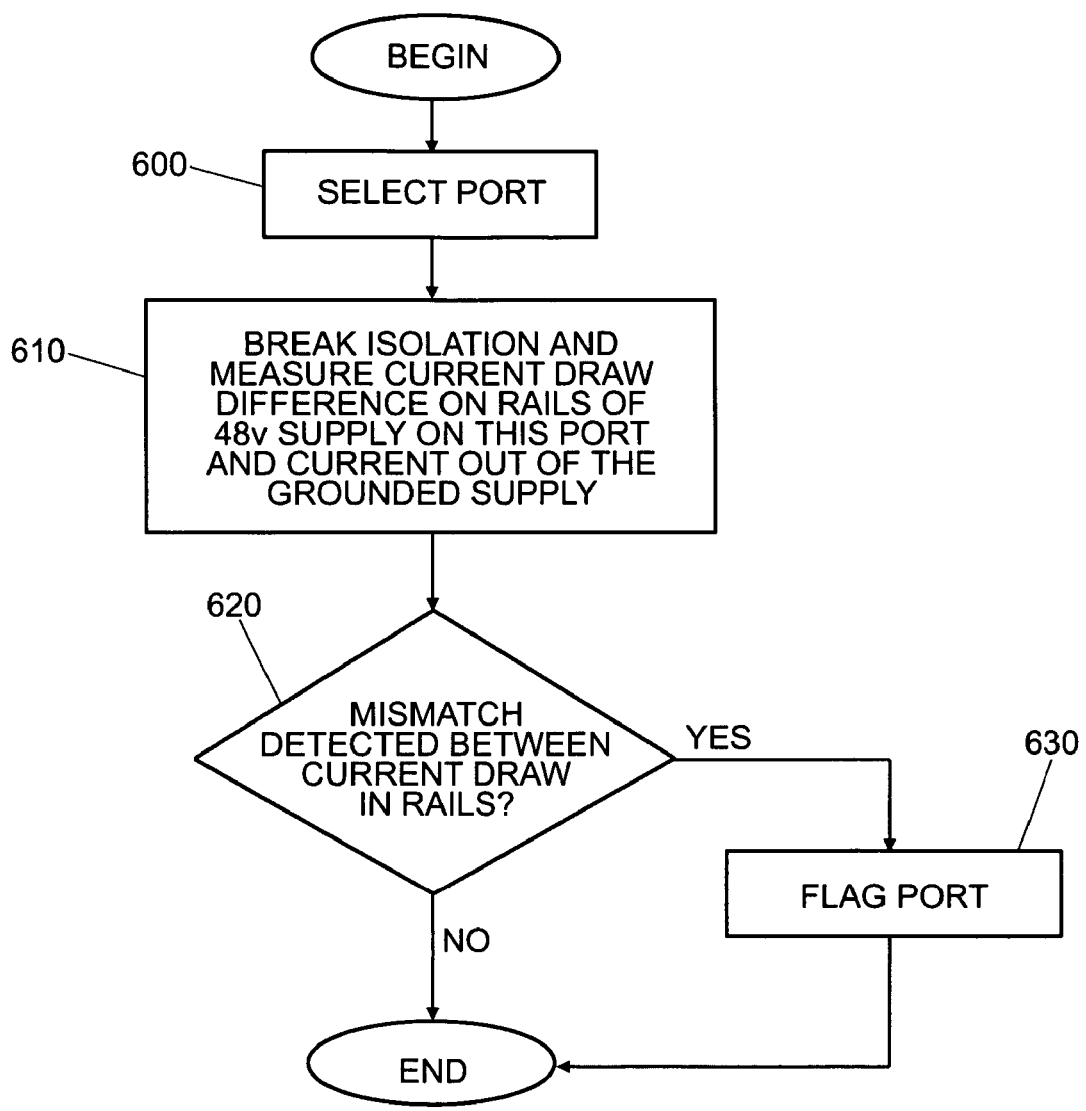

FIG. 6 is a flowchart of a method for detecting a ground fault in accordance with teachings of this disclosure. The process begins in act 600, where a particular port is selected for examination. The process then moves to query 610, where isolation is broken on all selected ports of an inline power source. In a preferred embodiment, a current source is selectively switched in series with each rail of the selected inline power source where the port under check is attached for a brief time (i.e., hundreds of milliseconds function of the settling time of the measuring circuitry) to source a small amount of current (i.e., tens of mA). The source may select switches in the proper polarity for the selected rail. The current drawn through each rail may be measure and stored, as is the current drawn directly out of the source.

These levels may then be compared to determine if there is a mismatch in current drawn through the rails of a specific port, indicating a path to ground through one or both rails in query 620. If a mismatch is detected, the selected port may then be flagged in act 630. In one embodiment, a detected increase in current on the rail of any specific port substantially equal in magnitude to the current delivered in or out of the grounded power source indicates that such a port has a path to ground or is faulty. When more than one port faults simultaneously, the same disclosed detection concept applies. In such cases, it is contemplated that the current limit on the grounded source may be programmable to enable more than one port to show their faults.

Figure 7:
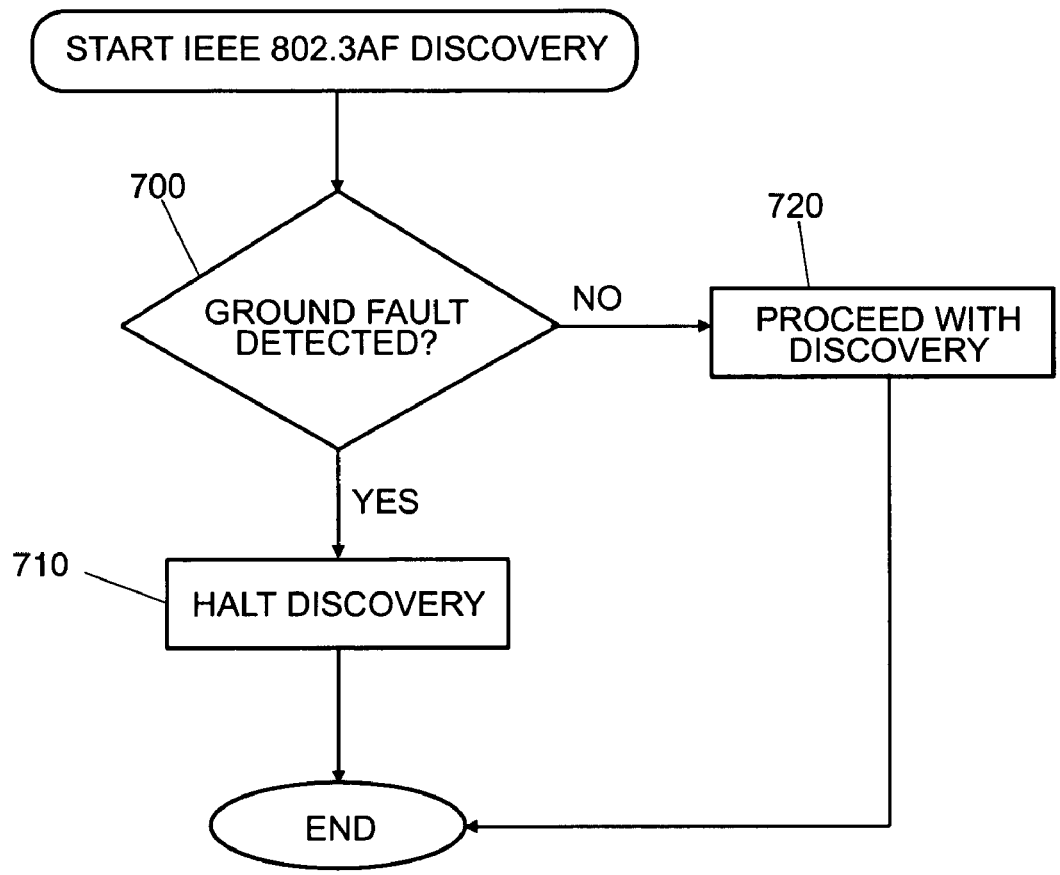
FIG. 7 is a flowchart of a method for preventing the powering of a faulty port in an Ethernet system in accordance with this disclosure.

It is contemplated that the teachings of this disclosure may be used in conjunction with the discovery process of the IEEE 802.3af standard. FIG. 7 is a flowchart of a method for preventing the powering of a faulty port. In one embodiment, the process begins as a selected port is beginning the discovery process, such as when a PD has presented itself to be discovered and powered. It is contemplated that prior to powering the device, the port is scanned for ground faults in query 700. It is contemplated that a selected port may be scanned in accordance with the teachings of this disclosure as described above.

If no ground faults are detected, then the discovery process is allowed to proceed in act 710. However, if a ground fault is detected, the discovery process is halted prior to the port being powered up. As will be appreciated, preventing a potentially faulty port from being powered up has great benefits because, as discussed above, a single ground fault may cause potential problems throughout a system through shared rails.

Figure 8:
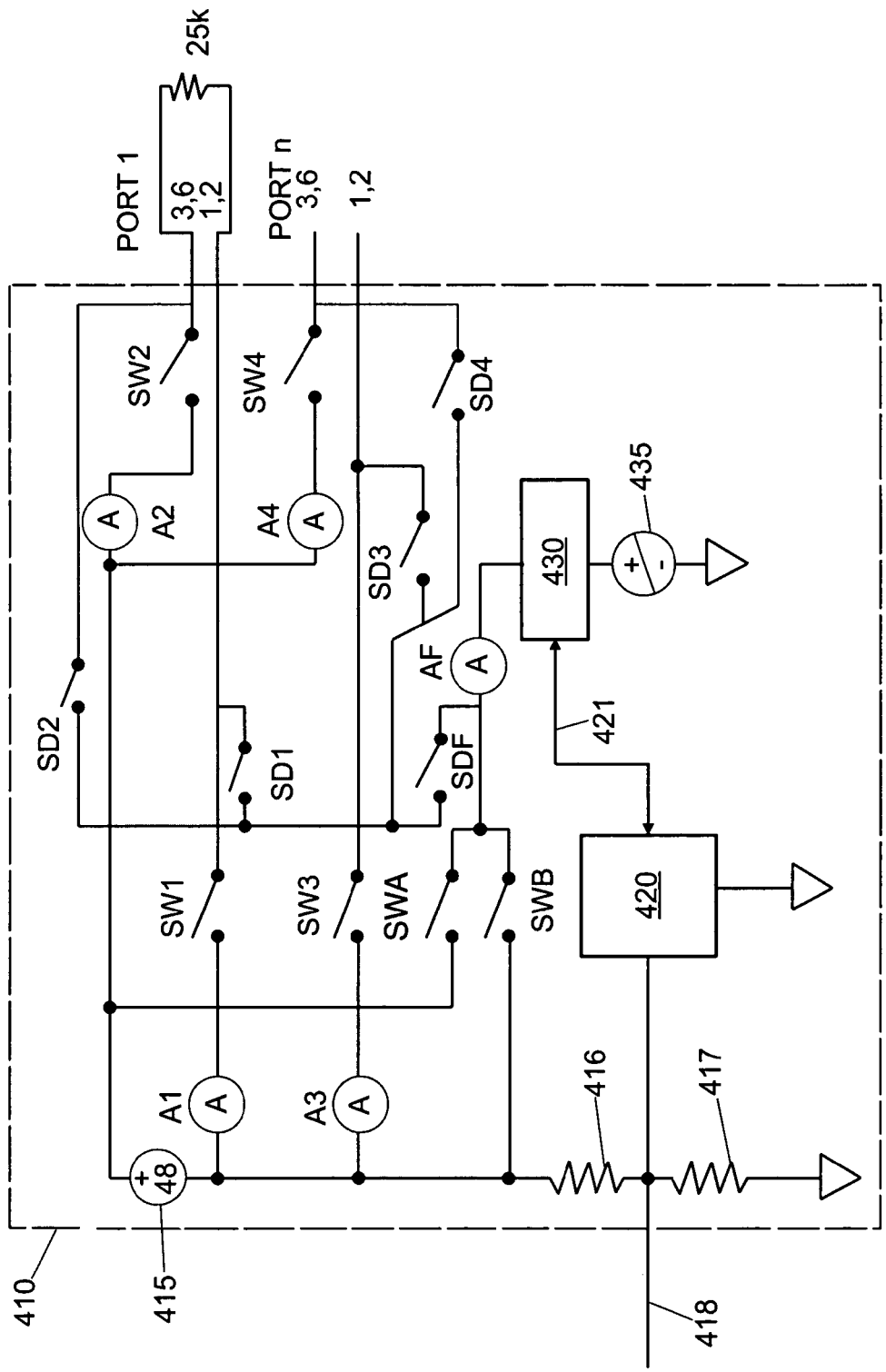
FIG. 8 is a block diagram of another embodiment of an Ethernet system configured to detect ground faults in accordance with this disclosure.

One further embodiment for checking for a ground fault during the discovery process involves connecting one rail of the 48 v source at a time after a successful discovery, and before power is applied to a grounded source similar to source 435 as shown in FIG. 8. In such an embodiment, the only current expected is the fault sensing current, and sensing a lower value current is much easier when the only current expected is known current. Also, selected isolation cancellation of one selected port may be achieved by keeping SW1 and SW2 open, as this allows for localized isolation cancellation for one port instead of all ports, as SW1 and SW2 keep the rest of the inline power system isolated from the single PD load.

The process may then be repeated for the other rails of the 48 v supply on that port where the PD side of a switch is provided with a path to ground, and a fault current detection attempt is made without a total system isolation cancellation and before power is applied on that port. Switches SD1, SD2 and SDF may be controlled by the inline power IC with switch SDF sequentially enabled for one port at a time, and may comprise a high voltage mechanical relay while switches SD1 and SD2 in the case of port 1 of FIG. 8 may comprise high voltage transistors inside the inline power controller integrated circuit.

When a port is selected for testing for a ground fault, the inline power controllers in the system negotiate the identity of the port under test by communicating among themselves and switch SDF is closed while the port under test closes its SD1 and SD2 switches one at a time causing a local isolation cancellation for each pair as switches SW1 and SW2 would still be closed. While FIG. 8 shows switch SDF as the path to a grounded source, other means to supply a resistor greater than 2 MΩ through the SD1 and or SD2 connection applies such as that disclosed in the circuitry 420 along with the 6 MΩ of resistance provided for preserving isolation to all ports including the one under test, yet using circuitry that can detect lower current and has better dynamic range that scales with the expected faults. Such embodiments may save money on the cost and reliability of relays employed herein.

An alternate approach would be that of closing SW1 or SW2 one at a time on a port after a successful 25 k detection is achieved and before power is applied to that port through the closing of both switches SW1 and SW2. Such an embodiment may be achieved using circuitry disclosed above such as in circuitry 420 or 430. In such an embodiment, all ports attached to inline power source 415 would temporarily experience suspended isolation to ground including the rail on the port under test that is being evaluated for a ground fault. If the circuitry 420 triggers this implies a potential fault and any combination of the processes described herein may be deployed in sequence to increase the confidence level of the presence of such a fault and a decision is made whether to apply power to the faulty port and or to keep it from powering up. There may be instances where applying power does not cause damage or is not a major issue, and the user may be given the option to configure the system to react in the proper manner.

The ground fault detection through the 6MΩ resistor, and the GFI test, may each be operating separately. That is, the ground fault detection can operate continuously as it is non-intrusive, and the GFI test can be set up to operate periodically as needed or it is enabled all the time on a powered port, such as when a new device is connected, or according to a timer.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. An apparatus, comprising:
   an Ethernet switch configured to provide inline power to a plurality of ports, where members of the plurality of ports comprise a positive rail and a negative rail;

a power source operatively disposed in the Ethernet switch between the positive rails and the negative rails;

a floating resistance disposed between the power source and the negative rails for providing isolation from ground for the plurality of ports, the floating resistance comprising a voltage divider sensing node;

ground fault circuitry operatively coupled to a voltage divider sensing node, the ground fault circuitry configured for sensing a current flowing through the floating resistance;

current sensing circuitry disposed in series within the positive rails and the negative rails of the plurality of ports;

find port circuitry disposed between the rails, the find port circuitry being configured to selectively couple a secondary power source in parallel with the floating resistance, thereby breaking ground isolation for the plurality of ports and increasing current flowing through the plurality of ports to facilitate detecting a fault in a member of the plurality of ports;

and to detect a current mismatch between the positive rails and the negative rails of one or more members of the plurality of ports; and where the ground fault circuitry is configured to detect a ground fault in at least one of the plurality of ports of the Ethernet switch when the current detected at the voltage divider sensing node exceeds a predefined level.

2. The apparatus of claim 1, where all ports of the Ethernet switch have ground isolation broken simultaneously.

3. The apparatus of claim 1, where a selected one of the plurality of ports has ground isolation broken.

4. The apparatus of claim 1, where a port undergoing the discovery process according to IEEE 802.3af is scanned for ground faults prior to powering up an Ethernet Powered Device (PD).

5. The apparatus of claim 4, where the scanned port is not powered up if a ground fault is detected.

* * * * *